(12) United States Patent
Medana

(10) Patent No.: US 7,798,637 B2
(45) Date of Patent: Sep. 21, 2010

(54) HIGH-AMPLITUDE ELASTIC HINGE ELEMENT FOR EYEGLASS FRAME

(75) Inventor: Guido Medana, Valdobbiadene (IT)

(73) Assignee: Comotec S.A., Morez (FR)

( * ) Notice: Subject to any disclaimer, the term of this patent is extended or adjusted under 35 U.S.C. 154(b) by 5 days.

(21) Appl. No.: 12/447,102

(22) PCT Filed: Oct. 1, 2007

(86) PCT No.: PCT/IB2007/002918
§ 371 (c)(1),
(2), (4) Date: Apr. 24, 2009

(87) PCT Pub. No.: WO2008/050189
PCT Pub. Date: May 2, 2008

(65) Prior Publication Data
US 2010/0091237 A1    Apr. 15, 2010

(30) Foreign Application Priority Data
Oct. 24, 2006   (FR)   ................................ 06 09302

(51) Int. Cl.
*G02C 5/16* (2006.01)
(52) U.S. Cl. .................. 351/113; 351/153; 16/228

(58) Field of Classification Search .............. 351/113, 351/114, 121, 153; 16/228
See application file for complete search history.

(56) References Cited

U.S. PATENT DOCUMENTS

| | | | | |
|---|---|---|---|---|
| 4,750,828 A | * | 6/1988 | Sartor | ........................ 351/115 |
| 2009/0303431 A1 | * | 12/2009 | Ifergan | ........................ 351/153 |

FOREIGN PATENT DOCUMENTS

| | | |
|---|---|---|
| EP | 0632306 | 1/1995 |
| WO | 9732234 | 9/1997 |
| WO | 2004097500 | 11/2004 |
| WO | 2005121873 | 12/2005 |

* cited by examiner

*Primary Examiner*—Huy K Mai
(74) *Attorney, Agent, or Firm*—Young & Thompson

(57) ABSTRACT

An elastic hinge member (10) for spectacles rims, includes a guiding area (22), a slide (30) having a guided part (32) cooperating with the guiding area (22) and a knuckle (31) and a return spring (40). The spring (40) has a compressibility that is sufficient for allowing the guided part (32) to come out of the guiding area (22), and the slide (30) can pivot about the longitudinal axis thereof in order to remain blocked in an "out-blocked" position that facilitates the assembling or disassembling operations of the knuckle with a spigot.

19 Claims, 5 Drawing Sheets

HIGH-AMPLITUDE ELASTIC HINGE ELEMENT FOR EYEGLASS FRAME

Figure 1A:
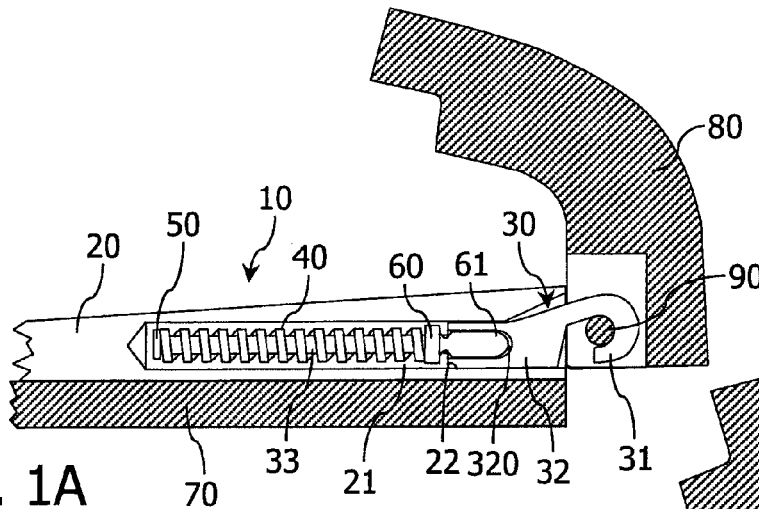

This invention relates to the domain of eyewear and hinges for an eyeglass frame, and it especially relates to an elastic hinge element for an eyeglass frame of the type shown in FIG. 1A or 2 of the application WO2005/121873 in the name of the applicant.

Such a hinge element comprises a slide located in a housing and a return spring of the slide. The slide comprises a guided part working with a guide zone of the housing and one end forming a knuckle extending to outside the housing. The spring works in compression between a rear stop that is integral with the slide and a front stop.

The hinge element is assembled at the factory before attachment to the frame. Once this assembly is completed, the slide has only a reduced path, making the mounting or dismounting of the hinge more difficult, especially its mounting because it is necessary to pull the slide against the return force applied by the spring and to attach the knuckle to a frame lug by means of an axle of the hinge at the same time.

This invention is designed to facilitate mounting or dismounting of the side-piece of the eyeglass frame, and it is directed especially at an elastic hinge element that makes it possible to perform these operations more easily.

For this purpose, the invention is based on the simple but no less inventive idea of providing a hinge element composed of a spring with compressibility that is sufficient to allow the guided part of the slide to leave its guide zone completely, and then to apply a rotational movement to the slide so that the latter remains locked in this position. It is then easy to perform the operations of mounting and dismounting the hinge. Another optional idea of the invention is to impart the shape of a hook to the knuckle in order to facilitate even more the operations of mounting and dismounting.

More especially, this invention calls for an elastic hinge element for an eyeglass frame, comprising a longitudinal housing composed of a guide zone, a slide arranged in the housing along one longitudinal axis of translation, the slide comprising a rear part with one end arranged in the housing, a guided part that works with the guide zone and a knuckle extending to outside the housing, and a return spring of the slide mounted between a rear stop and a front stop, in which the spring has compressibility that is sufficient to allow the guided part of the slide to leave the guide zone, the slide being able to pivot around its longitudinal axis when the guided part has left the guide zone so as to move the slide into the "locked-out" position that makes an operation of assembly or an operation of disassembly of the knuckle with a lug easier.

According to one embodiment, the spring in the state of maximum compression has a length that is less than or essentially equal to the distance that extends between the rear stop and front stop when the guided part of the slide leaves the guide zone.

According to one embodiment, the knuckle is in the form of a hook.

According to one embodiment, 4, the longitudinal housing is made in a box designed to be attached to a side-piece of the eyeglass frame.

According to one embodiment, the slide is housed in a box that includes two side extensions that hide the knuckle.

According to one embodiment, the rear stop of the spring is arranged on the end of the rear part of the slide.

According to one embodiment, the slide comprises a specific shape of its guided part or comprises a specific locking means so as to remain locked in a "locked-out" position after having been taken out of the guide zone and pivoted around its longitudinal axis.

One embodiment of the invention likewise relates to a hinge of an eyeglass frame comprising a hinge element according to the invention, a lug and a hinge axle connecting the hinge element to the lug.

According to one embodiment, the hinge has a position of overopening in which the lug and the knuckle work while preventing the slide from emerging farther in front of the guide zone.

According to one embodiment, the hinge element comprises two side cheeks that hide the zone of the hinge in which the axle connects the hinge element to the lug.

One embodiment of the invention likewise relates to a side-piece of eyeglasses comprising a hinge element according to the invention, the longitudinal housing being made in a box that is integral with the side-piece.

One embodiment of the invention likewise relates to an eyeglass frame comprising a rim, a side-piece of the eyeglasses comprising a hinge element according to the invention, the longitudinal housing being made in a box that is integral with the side-piece, a lug that is integral with the rim of the frame or formed by a part of the rim, and a hinge axle connecting the hinge element to the lug.

One embodiment of the invention likewise relates to a process of mounting or dismounting a hinge of an eyeglass frame comprising an elastic hinge element and a lug, the hinge element comprising a longitudinal housing comprising a guide zone, a slide arranged in the housing along one longitudinal axis of translation, the slide comprising a rear part with one end arranged in the housing, a guided part that works with the guide zone and a knuckle extending to outside the housing, and a return spring mounted between a rear stop and a front stop, the process comprising stages that consist in imparting to the return spring a compressibility that is sufficient to allow the guided part of the slide to leave the guide zone, moving the guided part outside of the guide zone, causing the slide to pivot around its longitudinal axis so that it remains locked in a "locked-out" position, and assembling or disassembling the knuckle and the lug.

According to one embodiment, the process comprises a stage consisting in imparting a defined shape to the guided part of the slide or in providing the slide with a specific locking means so that the slide remains locked in a "locked-out" position after having been taken out of the guide zone and pivoted around its longitudinal axis.

According to one embodiment, the spring is shaped so as to have, in the state of maximum compression, a length that is less than or essentially equal to the distance that extends between the rear stop and the front stop when the guided part of the slide leaves the guide zone.

According to one embodiment, the process comprises a stage consisting in imparting to the knuckle the shape of a hook to ensure its promptly catching on a hinge axle.

According to one embodiment, the knuckle and lug are assembled using a screw that forms one axle of the hinge.

According to one embodiment, the process comprises a stage consisting in providing on the lug and the knuckle at least one zone of working of the lug with the knuckle that prevents the slide from emerging farther in front of the guide zone when the hinge reaches a position of overopening.

According to one embodiment, the process comprises a stage consisting in providing the hinge element with two side cheeks that hide a zone of the hinge in which the axle connects the hinge element to the lug.

Figure 1B:
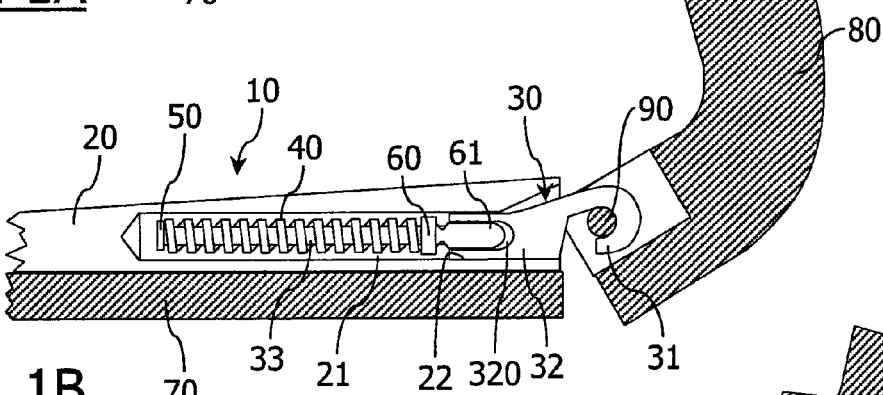
Figure 1C:
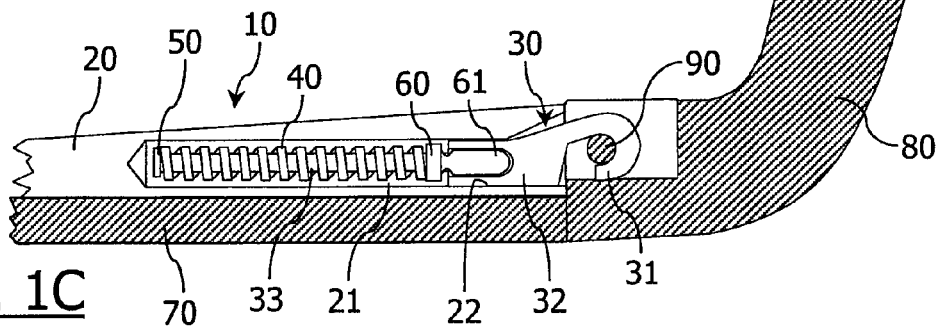
Figure 1D:
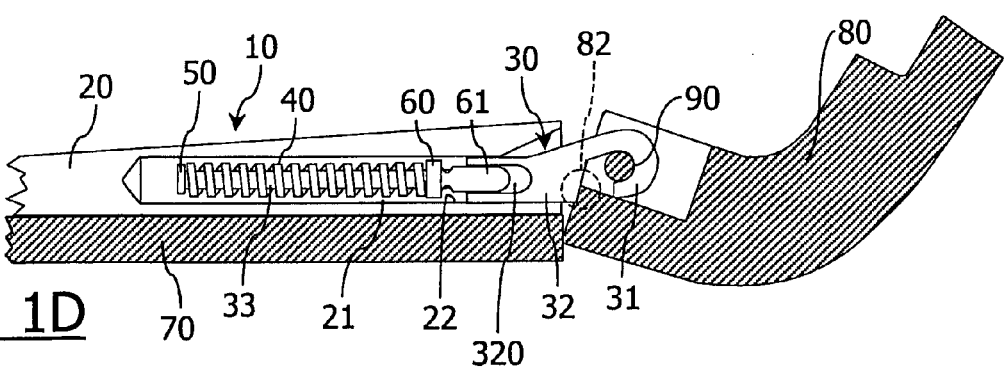
Figure 1E:
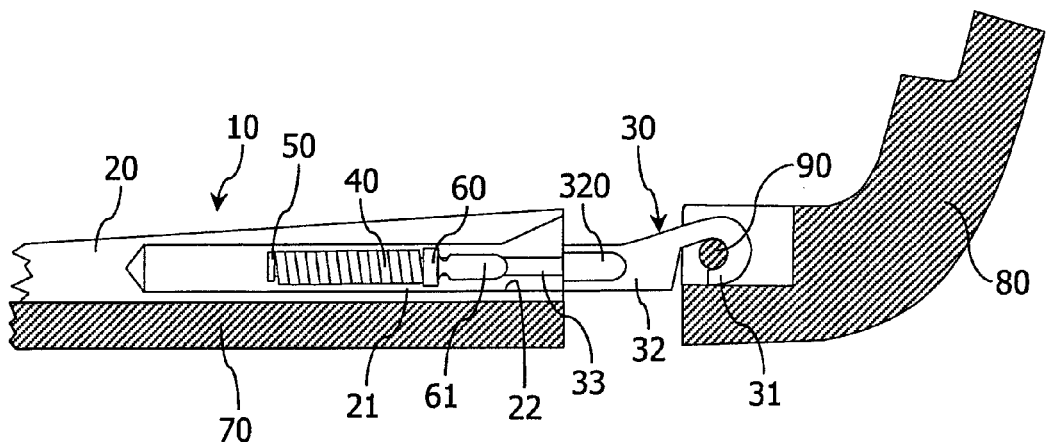
Figure 1F:
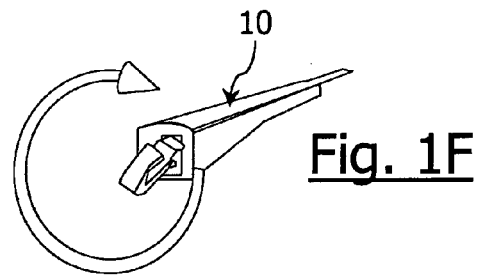
Figure 1G:
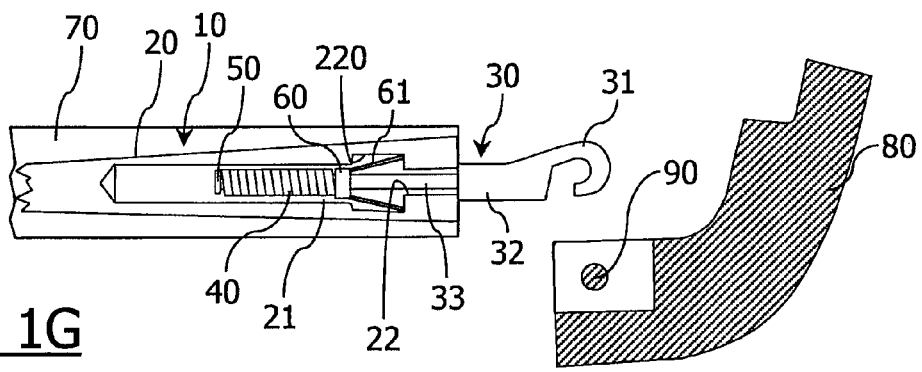
Figure 2A:
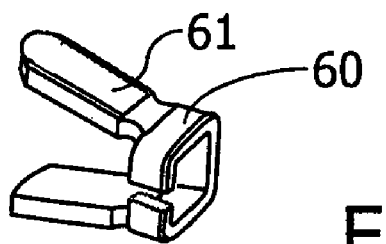
Figure 2B:
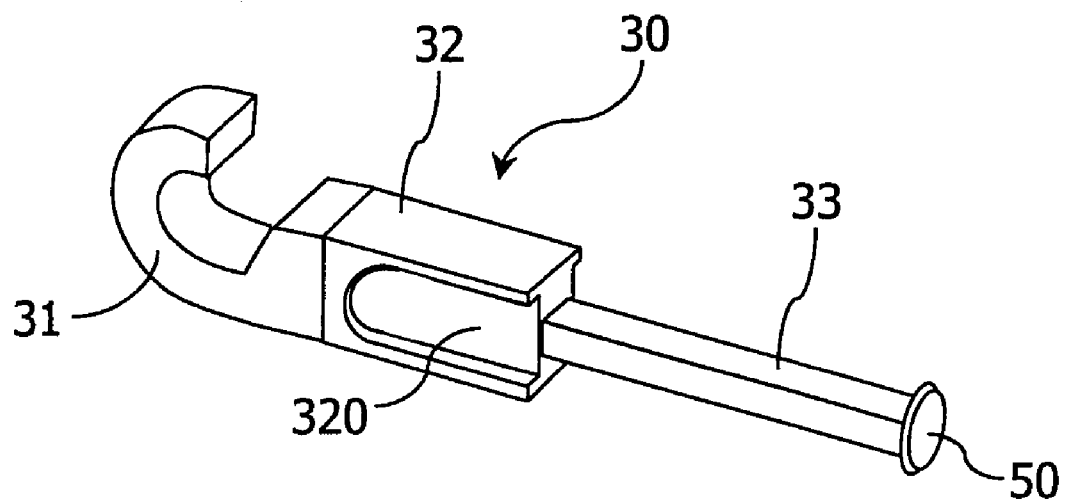
Figure 3A:
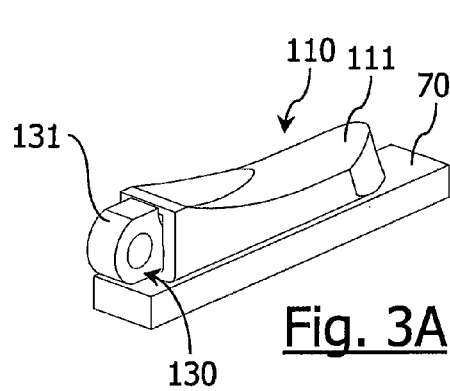
Figure 3B:
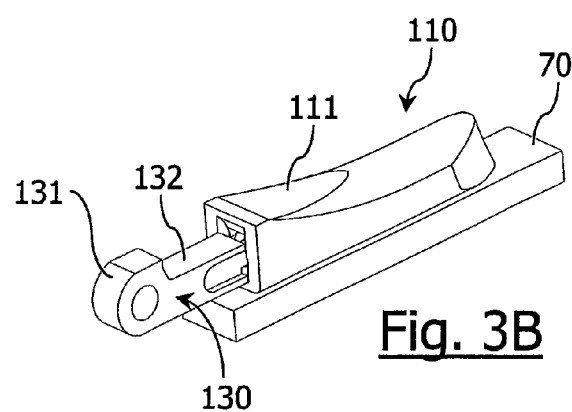
Figure 3C:
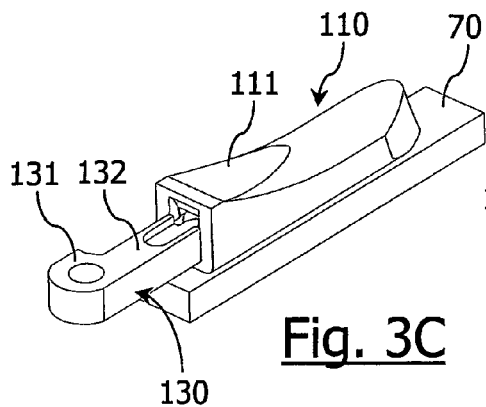
Figure 3D:
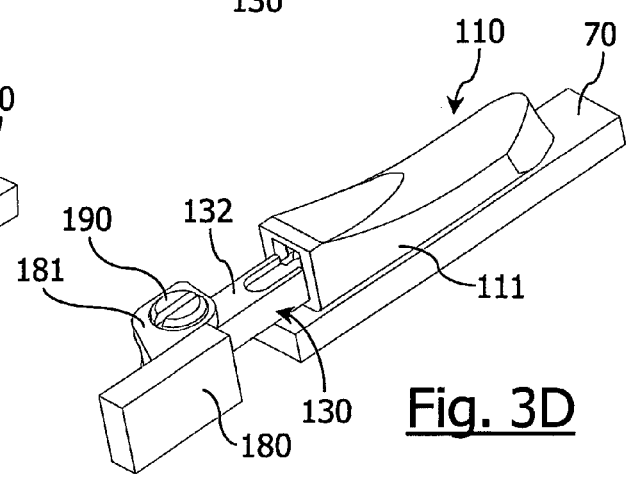
Figure 3E:
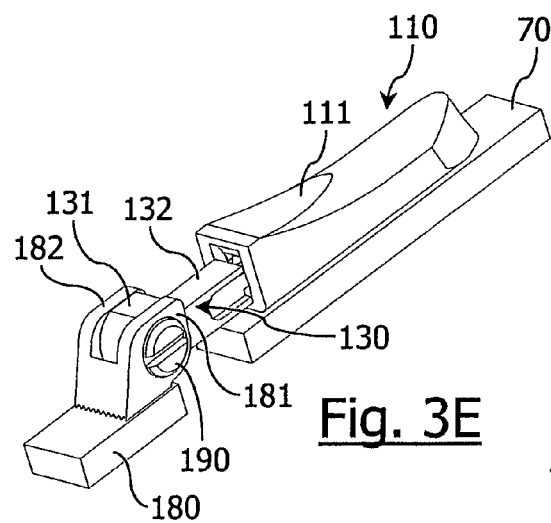
Figure 3F:
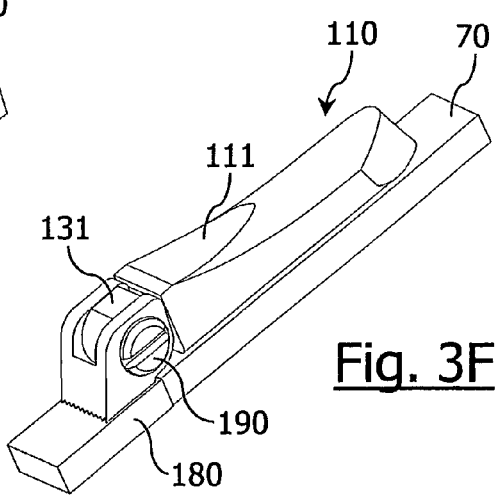
Figure 4A:
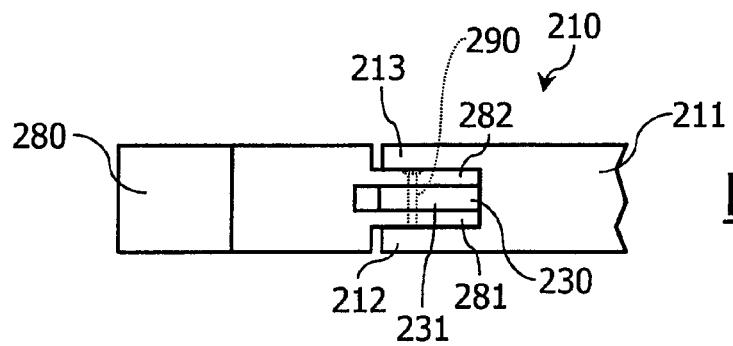
Figure 4B:
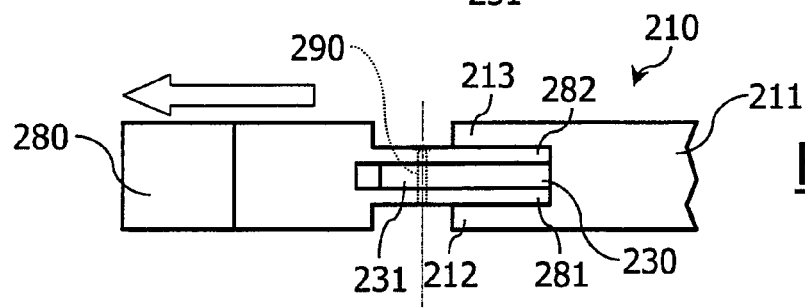
Figure 4C:
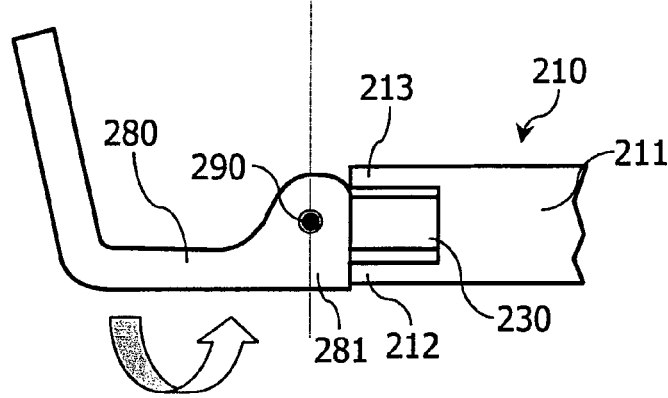
Figure 4D:
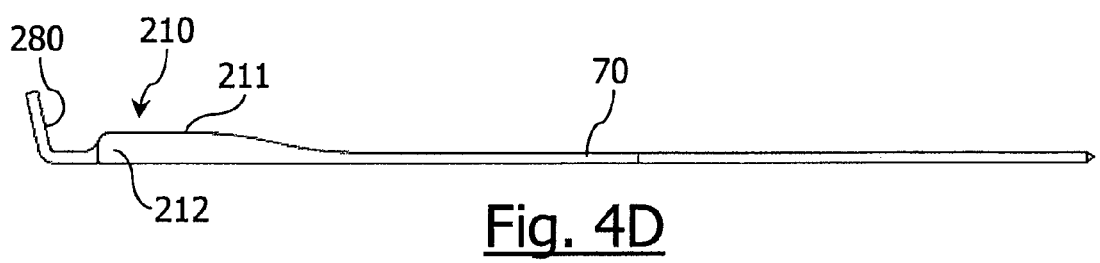
Figure 4E:
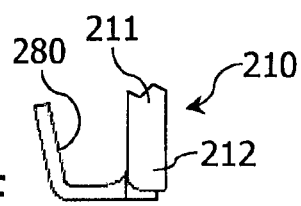
Figure 4F:
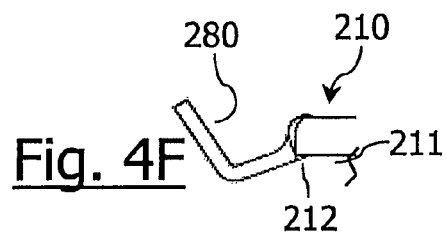

Embodiments of the invention will be disclosed in more detail below, with reference to the attached figures in a non-limiting manner, among which:

FIGS. 1A to 1D are cutaway views of one embodiment of a hinge according to the invention, respectively in a closed position, an intermediate position, an open position and a position of overopening, FIG. 1E is a cutaway view of the hinge when the slide is outside the guide zone, FIG. 1F is a perspective view showing a rotational movement applied to the slide, FIG. 1G is a cutaway view of the hinge in a "locked-out" position, FIG. 2A shows one embodiment of a front stop of the return spring, FIG. 2B shows one embodiment of the slide, FIGS. 3A to 3C are perspective views showing another embodiment of a hinge element according to the invention, respectively in the rest position, in the out position, and in the "locked-out" position, FIG. 3D illustrates a stage of assembly of the hinge element with a lug to form a hinge, FIGS. 3E and 3F show the stages in which the hinge returns to an operating position, and FIGS. 4A to 4C are side views of a hinge again comprising another embodiment of a hinge element according to the invention, shown respectively in the rest position, in the out position and in the "locked-out" position, and FIGS. 4D to 4F are top views of the hinge from FIGS. 4A to 4C, respectively in the open position, the closed position and in the position of overopening.

FIGS. 1A to 1G show a hinge comprising a hinge element 10 attached to a side-piece 70 and joined to a lug 80 by means of an axle of the hinge 90. The lug 80 is integral with the rim of the eyeglass frame (not shown) or is formed by a rim part of the frame. The lug can likewise be screwed onto a lens, in the case of a frame in a rim.

The hinge element 10 comprises a box 20, a slide 30 and a spring 40, here a helical spring, to return the slide to the rest position.

The box 20 comprises a longitudinal housing 21 whose front part comprises or forms a guide zone 22 of a noncircular, for example rectangular, cross-section. The slide 30 comprises a knuckle 31 that extends to outside the housing 21, a guided part 32 that works with the guide zone 22, and a pin 33 extending behind the housing 21. The spring 40 is mounted on the pin 33 and is sandwiched between a rear stop 50 that is integral with the pin 33 and a front stop 60 that is locked in translation.

FIG. 2A shows one example of the front stop. The stop is a type of ring 60 that comprises holding tabs 61 that fit into cavities 220 (FIG. 1G) provided in the guide zone 22 to prevent the ring 60 from sliding toward the front of the box.

FIG. 2B shows the slide 30 in perspective. The sides left and right of the guided part 32 comprise notches 320 (only the left-hand notch being visible) that accommodate the holding tabs 61 during insertion of the slide 30 and of the ring 60 into the box. The tabs 61 then unfold in the cavities 220 (FIG. 1G) while preventing the ring and the slide from escaping from the box. The rear stop 50 can be simply a bead obtained by striking the end of the pin 33, as appears in this figure, or can likewise be implemented by bending the end of the pin 33 by 90°.

The hinge element 10 shown in FIGS. 1A to 1G has two characteristics:
 the knuckle 31 has the shape of a hook,
 the "compressibility" of the spring 40, i.e., its minimum length when it is in the state of maximum compression, is enough to allow the slide 30 to reach an "out" position shown in FIG. 1E, in which the guide part 32 of the slide is outside the guide zone 22.

For this purpose, the spring, here a helical spring, in the compressed state must have a length that is less than or essentially equal to the distance that extends between the rear stop 50 and the front stop 60 when the guided part 32 leaves the guide zone 22 ("out" position shown in FIG. 1E).

These two characteristics make it possible to easily mount or dismount the hinge as follows:

1) The slide is pulled to move the guided part 32 outside of the guide zone 22, as shown in FIG. 1E, 2) The slide 30 is caused to pivot around its longitudinal axis, as shown in FIG. 1F, for example by a quarter turn if the guided part 32 of the slide has a rectangular and not a square cross-section. After this rotation, the wider sides of the guided part 32 are facing the narrower walls of the guide zone 22, thus preventing the slide from penetrating into the guide zone. The slide remains locked in this position that will be called the "locked-out" position.

3) Once the "locked-out" positioned is reached, it is no longer necessary to hold the slide 30 to mount or dismount the hinge, as illustrated in FIG. 1G. Moreover, the hook shape of the hinge 31 allows prompt unhooking of the latter from the axle 90 or its prompt hooking onto the axle 90.

It will be noted that the cutaway view of FIG. 1G that corresponds to the "locked-out" position shows the hinge element 10 in a cutting plane that is perpendicular to the cutting plane of FIGS. 1A to 1E, excluding the slide 30 that, like the lug 80, is shown in the cutting plane of the preceding figures. Relative to the preceding figures, this representation corresponds to a rotation of the hinge element relative to the slide instead of a rotation of the slide relative to the hinge element. Actually, the rotation under consideration here is a rotation of the slide relative to the hinge element and can likewise consist of a rotation of the hinge element relative to the slide (especially during dismounting of the hinge, where it is easier to cause the side-piece to pivot on its longitudinal axis than to cause the frame to pivot around the longitudinal axis of the side-piece).

Moreover, the hinge is used as a conventional elastic hinge and has two stable positions, namely a closed position shown in FIG. 1A and an open position shown in FIG. 1C. The closed position is reached when the side-piece 70 is folded down onto the rim of the eyeglass frame (or onto the lenses in the case of a rimless frame).

In an intermediate position shown in FIG. 1B, the slide 30 is pulled forward, and the spring 40 applies an elastic return force. Thus, the hinge has an elastic effect in passage from the closed position to the open position and vice-versa.

Preferably, the hinge can reach a position of overopening as shown in FIG. 1D. In this position, a precaution must be taken to prevent the slide 30 from departing completely from the guide zone 22 (i.e., reaching the "out" position). This precaution consists in, for example, providing a stop. In the embodiment shown in FIG. 1D, one edge of the lug 80 will be supported on a wall of the knuckle 90 (zone 82 marked by a dot-dash circle) when a maximum angle of overopening is reached. This prevents the slide 30 from leaving the guide zone 22, and the hinge is "auto-locked."

FIGS. 3A to 3F illustrate a hinge comprising a hinge element 110. The hinge element 110 comprises a slide 130 whose end forms a knuckle 131 of the conventional type, comprising a hinge eye (boring) instead of being in the shape of a hook. As above, the slide is arranged in a box 111 comprising a longitudinal housing whose front part comprises or forms a guide zone of the slide.

In FIG. 3A, the box 111 of the hinge element is attached to a side-piece 70 (shown partially and schematically), and the slide 130 is kept in the rest position by the spring.

In FIG. 3B, the slide is pulled until the guided part 132 is outside the guide zone ("out" position).

In FIG. 3C, the slide is caused to turn on itself by a quarter turn, so that the guided part 132 is supported on the front side of the box 111 and can no longer penetrate into the guide zone ("locked-out" position), the guided part 132 being rectangular in shape.

In FIG. 3D, the knuckle is assembled with a lug 180 by means of a screw 190 forming the axis of rotation of the hinge. The screw is held by two parallel flanges 181, 182 of the lug 180, and they extend from each side of the knuckle 131 and comprise openings that form bearings. The screwing stage is facilitated by the fact that the "locked-out" position makes it possible to align the opening of the knuckle with that of the lug before inserting the axle and screwing it in.

In FIG. 3E, the slide 130 is caused to pivot by a quarter turn in the reverse direction so as to re-align the guided part 132 with the opening of the guide zone. In FIG. 3F, the slide has re-entered the guide zone, and the hinge has recovered its normal position under the action of the spring return force.

FIGS. 4A to 4F again show another variant embodiment of a hinge according to the invention comprising a hinge element 210, a lug 280 and a screw 290 forming a hinge axle that connects the hinge element 210 to the lug 280. As above, the hinge element 210 comprises a box 211 that is integral here with a side-piece 70 (shown in FIG. 4D).

The hinge is seen from the side in FIGS. 4A to 4C. The box 211 comprises, as above, a longitudinal housing whose front part comprises or forms a guide zone of a slide 230. The slide 230 comprises a guided part working with the guide zone and one end forming a knuckle 231 comprising a hinge eye that is crossed by the screw 290. As above, the lug 280 comprises two parallel flanges 281, 282 that extend from each side of the knuckle 231 and accommodate the ends of the screw 290.

In this embodiment, the width of the lug 280 in the hinge zone, i.e., the distance between the two outer surfaces of the flanges 281, 282, is less than the width of the box 211. The box 211 comprises two lateral extensions 212, 213 forming cheeks that extend from each side of the hinge, the cheek 212 extending parallel to the flange 281 and the cheek 213 extending parallel to the flange 282.

Thus, the cheeks 212, 213 hide the hinge zone that is generally unattractive, especially the ends of the screw 290 and especially the head of the screw. The cheeks 212, 213 can likewise engender a technical effect by holding the flanges 281, 282 laterally and thus limiting the lateral play of the hinge, which is generally "amplified" at the end of the side-piece.

This characteristic is made possible by the fact that, according to the primary characteristic of the invention, the slide 230 can leave the guide zone, and the knuckle can be moved into a position in which it is no longer hidden by the cheeks 212, 213 so that the hinge element 210 and the lug 280 can be easily assembled or disassembled.

The operation of dismounting the hinge is illustrated in FIGS. 4B, 4C. In FIG. 4B, the knuckle 231 is moved outside of the zone hidden by the cheeks 212, 213 by applying a movement away from the box 211 relative to the lug 280 (for example by pulling on the side-piece). Then, a rotational movement of the knuckle relative to the box is applied (or reciprocally of the box relative to the knuckle, for example by causing the side-piece to pivot), so that the hinge is in the "locked-out" position. Actually, the slide 230 can no longer return to the box 211 due to the flanges 281, 282 being located in a position that is not parallel to the cheeks 212, 213 and thus being locked by them.

The aesthetic effect of this technical characteristic appears clearly in FIGS. 4D to 4F, which show the hinge from overhead. FIG. 4D shows the hinge in an open position (side-piece unfolded), FIG. 4E shows the hinge in a closed position (side-piece folded down onto the rim of the frame), and FIG. 4F shows the hinge in the position of overopening (side-piece pulled beyond the normal unfolded position). Whatever the position of the side-piece, the hinge zone remains unseen when the eyeglass frame is viewed in a direction that is essentially parallel to the hinge axis (either from above or below).

Thus, it will be noted that the locking of the slide in the "locked-out" position can be ensured by the particular shape of the flanges of the lug relative to the shape of the box and/or by a specific shape of the guided part of the slide (non-circular section) relative to the shape of the guide zone.

If locking of the slide is uniquely ensured by locking of the flanges of the lug against the box, the slide could return to its guide housing after the lug is dismounted.

Generally, different shapes of the slide can allow locking of the slide in the "locked-out" position, for example a square cross-section. In this case, the "locked-out" position requires a rotation that is less than or greater than ¼ of a turn so that the slide remains across the opening of the guide zone and does not penetrate into the latter.

Specific means that make it possible to keep the slide in the locked-out position can likewise be provided. It can be, for example, a lateral catch that is integral with the slide, forming a projection of the slide extending in a direction that is perpendicular to the axis of translation of the slide.

In this case, a groove for accommodating the catch is made in the housing, so that the catch slides in the groove when the slide is driven in translation. Once the slide leaves the guide zone, and after having applied a rotational movement to it, the catch keeps the slide in the locked-out position by coming to rest against the holding wall, for example the front surface of the box.

In this case, the general shape of the guided part of the slide does not take part in the locking operation, and the guided part can be of a general cylindrical shape (or a circular cross-section) since it is the catch that ensures the locking function.

It will be apparent to one skilled in the art that a hinge according to the invention is capable of various other embodiments, especially with respect to the internal structure of the hinge element and its component parts (spring, front and rear stops, shape of the slide).

Moreover, as appears in FIG. 4D, the hinge element can be completely integrated into a side-piece instead of being attached to the side-piece, as appears in FIGS. 3A to 3F. The hinge element can likewise be integral with the frame, and the lug can be integral with the side-piece.

The invention claimed is:

1. Elastic hinge element (10, 110, 210) for eyeglass frames, comprising:

a longitudinal housing (21) comprising a guide zone (22), a slide (30, 130, 230) arranged in the housing along one longitudinal axis of translation, the slide comprising a rear part (33) with one end (50) arranged in the housing (21), a guided part (32, 132) that works with the guide zone, and a knuckle (31, 131, 231) extending to outside the housing, and a return spring (40) of the slide mounted between a rear stop (50) and a front stop (60), characterized in that the spring (40) has compressibility that is sufficient to allow the guided part (32, 132) of the slide to leave the guide zone (22), and in that the slide (30, 130, 230) can pivot around its longitudinal axis when the guided part (32, 132) has left the guide zone so as to move the slide into a "locked-out" position that makes an operation of assembly or an operation of disassembly of the knuckle with a lug (80, 180, 280) easier.

2. Hinge element according to claim 1, wherein the spring (40) in the state of maximum compression has a length that is less than or essentially equal to the distance that extends between the rear stop (50) and the front stop (60) when the guided part (32, 132) of the slide leaves the guide zone.

3. Hinge element (10) according to claim 1, wherein the knuckle (31) is in the form of a hook.

4. Hinge element (10, 110, 210) according to claim 1, wherein the longitudinal housing (21) is made in a box (20, 111, 211) designed to be attached to a side-piece of the eyeglass frame.

5. Hinge element (210) according to claim 1, wherein the slide is housed in a box (211) that includes two side extensions (212, 213) that hide the knuckle (231).

6. Hinge element according to claim 1, wherein the rear stop (50) of the spring is arranged on the end of the rear part (33) of the slide (30).

7. Hinge element according to claim 1, wherein the slide (30, 130, 230) comprises a specific shape of its guided part or comprises a specific locking means so as to remain locked in a "locked-out" position after having been taken out of the guide zone and pivoted around its longitudinal axis.

8. Eyeglass frame hinge comprising:
a hinge element (10, 110, 210) according to claim 1,
a lug (80, 180, 280), and
a hinge axle (90, 190, 290) connecting the hinge element (10, 110, 210) to the lug (80, 180, 280).

9. Hinge according to claim 8, having a position of overopening in which the lug (80) and the knuckle (31) work (82) by preventing the slide from emerging farther in front of the guide zone.

10. Hinge according to claim 8, wherein the hinge element (210) comprises two side cheeks (212, 213) that hide a zone of the hinge in which the axle (290) connects the hinge element (210) to the lug (280).

11. Side-piece of eyeglasses (70) comprising a hinge element (10, 110, 210) according to claim 1, the longitudinal housing (21) being made in a box (20, 111, 211) that is integral with the side-piece.

12. Eyeglass frame comprising:
a rim,
a side-piece of the eyeglasses according to claim 11,
a lug (80, 180, 280) that is integral with the rim of the frame or formed by a part of the rim, and
a hinge axle (90, 190, 290) connecting the hinge element (10, 110, 210) to the lug (80, 180, 280).

13. Process of mounting or dismounting a hinge of an eyeglass frame comprising an elastic hinge element (10, 110, 210) and a lug (80, 180, 280), the hinge element comprising:
a longitudinal housing (21) comprising a guide zone (22),
a slide (30, 130, 230) arranged in the housing (21) along one longitudinal axis of translation, the slide comprising a rear part (33) with one end (50) arranged in the housing (21), a guided part (32, 132) that works with the guide zone (22) and a knuckle (31, 131, 231) extending to outside the housing, and
a return spring (40) mounted between a rear stop (50) and a front stop (60),
characterized in that it comprises stages consisting in:
imparting to the return spring (40) a compressibility that is sufficient to allow the guided part (32, 132) of the slide (30, 130, 230) to leave the guide zone,
moving the guided part (32, 132) outside of the guide zone (22),
causing the slide (30, 130, 230) to pivot around its longitudinal axis so that it remains locked in a "locked-out" position, and
assembling or disassembling the knuckle (31, 131) and the lug (80, 180, 280).

14. Process according to claim 13, comprising a stage consisting in imparting a defined shape to the guided part of the slide (30, 130, 230) or in providing the slide with a specific locking means so that the slide remains locked in a "locked-out" position after having been taken out of the guide zone and pivoted around its longitudinal axis.

15. Process according to claim 13, wherein the spring (40) is shaped so as to have, in the state of maximum compression, a length that is less than or essentially equal to the distance that extends between the rear stop (50) and the front stop (60) when the guided part (32, 132) of the slide leaves the guide zone.

16. Process according to claim 13, comprising a stage consisting in imparting to the knuckle (31) the shape of a hook to ensure its promptly catching on a hinge axle (90).

17. Process according to 13, wherein the knuckle (131, 231) and the lug (180, 280) are assembled using a screw (190, 290) that forms one axle of the hinge.

18. Process according to claim 13, comprising a stage consisting in providing on the lug (80) and the knuckle (31) at least one zone of working (82) of the lug with the knuckle that prevents the slide from emerging farther in front of the guide zone when the hinge reaches the position of overopening.

19. Process according to claim 13, comprising a stage consisting in providing the hinge element (210) with two side cheeks (212, 213) that hide a zone of the hinge in which the axle (290) connects the hinge element (210) to the lug (280).

* * * * *